(12) United States Patent
Boudreau et al.

(10) Patent No.: US 11,021,991 B2
(45) Date of Patent: Jun. 1, 2021

(54) PROXIMITY VANE ANGLE MEASUREMENT

(71) Applicant: United Technologies Corporation, Farmington, CT (US)

(72) Inventors: Daniel J. Boudreau, South Windsor, CT (US); Eli Cole Warren, Wethersfield, CT (US); Bryan J. Hackett, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 4 days.

(21) Appl. No.: 16/428,051

(22) Filed: May 31, 2019

(65) Prior Publication Data
US 2020/0378270 A1 Dec. 3, 2020

(51) Int. Cl.
*F01D 17/02* (2006.01)
*F01D 17/16* (2006.01)
*F01D 9/04* (2006.01)
*G01D 5/00* (2006.01)
*F04D 27/00* (2006.01)
(Continued)

(52) U.S. Cl.
CPC .......... *F01D 17/162* (2013.01); *F01D 9/041* (2013.01); *F01D 17/02* (2013.01); *F04D 27/00* (2013.01); *F04D 27/002* (2013.01); *F04D 27/02* (2013.01); *F04D 27/0246* (2013.01); *G01D 5/00* (2013.01); *G01M 15/14* (2013.01); *F05D 2220/32* (2013.01); *F05D 2240/12* (2013.01); *F05D 2270/80* (2013.01)

(58) Field of Classification Search
CPC ........ F04D 27/00; F04D 27/002; F04D 27/02; F04D 27/0246; F04D 27/56; F04D 27/563; G01D 5/00; G01D 5/14
See application file for complete search history.

(56) References Cited

U.S. PATENT DOCUMENTS 5,211,539 A     5/1993   McCarty
5,572,119 A * 11/1996   Taylor ................. F16C 32/0446
                                                                                      174/261

(Continued)

FOREIGN PATENT DOCUMENTS

DE       19813318 A1    9/1999
EP        2966268 A1    1/2016

OTHER PUBLICATIONS

European Search Report for European Application No. 20177224.1; dated Aug. 24, 2020; 6 pages.

*Primary Examiner* — J. Todd Newton
*Assistant Examiner* — Andrew J Marien
(74) *Attorney, Agent, or Firm* — Cantor Colburn LLP

(57) ABSTRACT

A measurement system for determining an angular position of a component of a gas turbine engine includes one or more proximity sensors positioned at a fixed structure of the gas turbine engine and one or more sensor targets positioned at a rotatable component of the gas turbine engine. Each sensor target of the one or more sensor targets includes a target surface having a variable distance between the target surface and the proximity sensor with rotation of the rotatable component about a component axis of rotation. A measurement of distance between the proximity sensor and the target surface as measured by the proximity sensor is indicative of an angular position of the rotatable component relative to the component axis of rotation.

17 Claims, 5 Drawing Sheets

(51) Int. Cl.
    *G01M 15/14*     (2006.01)
    *F04D 27/02*     (2006.01)

(56) References Cited

U.S. PATENT DOCUMENTS

| | | | |
|---|---|---|---|
| 10,132,189 B2 * | 11/2018 | Henson | F01D 9/041 |
| 2008/0273965 A1 * | 11/2008 | Rajamani | F01D 21/003 |
| | | | 415/129 |
| 2009/0021247 A1 | 1/2009 | Braun et al. | |
| 2012/0107094 A1 * | 5/2012 | Lillis | F04D 27/001 |
| | | | 415/118 |
| 2016/0123718 A1 | 5/2016 | Marocchini et al. | |
| 2016/0356172 A1 * | 12/2016 | DiVincenzo | F01D 17/02 |
| 2018/0304991 A1 | 10/2018 | Kudrna et al. | |
| 2018/0306053 A1 | 10/2018 | Chapman | |
| 2019/0178847 A1 * | 6/2019 | Lovejoy | F01D 17/02 |

\* cited by examiner

PROXIMITY VANE ANGLE MEASUREMENT

BACKGROUND

Exemplary embodiments of the present disclosure pertain to the art of gas turbine engines, and more particularly to variable pitch vane systems of gas turbine engines.

Variable pitch vane systems are used to dynamically vary flow angles within a gas turbine engine throughout the engine cycle. It is imperative to precisely determine vane positional angles at any selected point throughout the cycle.

In the course of gas turbine engine development and operation it is imperative to have a method of monitoring variable vane position. The current methodology for monitoring variable pitch vane position is to employ RVDT's (Rotary Variable Differential Transformers) coaxially tied to the vane stems. The data provided is used to measure and calibrate variable vane arm schedules for flow control on gas turbine engines. Additionally, those variable vane arm schedules can be used to define the position of downstream stator vanes. The RVDT is comprised of a housing out of which protrudes a rotating stem. The stem of the RVDT sensor needs to be directly mounted to the rotating component, typically the variable vane stem, with the housing being held fixed. The connection is typically performed via either a flexible bellows or an inflexible union. Prior experience has shown that RVDT's perform best when the housing is secured independent of rotating hardware. In all manners the RVDT sensor is in direct contact with the rotating hardware and the housing itself needs to be fixed to not rotate. A significant shortcoming of the RVDT is its max use temperature, 400 F, is significantly lower than the environment in which it needs to be used. As such, there is a need to provide cooling medium, typically compressed air or gaseous Nitrogen. Additionally, there is a need to design housings to encapsulate the sensor and cooling medium as well as work required to ingress and egress tubing or piping to carry the cooling medium. Capacitance probes function by varying output voltage based on changes in capacitance present at the sensor tip as generated by changes in linear distance to a target surface. The capacitance probe requires a calibration to relate the voltage change to a corresponding gap to target change. Certain characteristics of capacitance probes make them ideal for use in gas turbine engine applications including; resolution is on the order of 0.0002", temperature capability of ~1800 F and small form factor.

BRIEF DESCRIPTION

In one embodiment, a measurement system for determining an angular position of a component of a gas turbine engine includes one or more proximity sensors positioned at a fixed structure of the gas turbine engine and one or more sensor targets positioned at a rotatable component of the gas turbine engine. Each sensor target of the one or more sensor targets includes a target surface having a variable distance between the target surface and the proximity sensor with rotation of the rotatable component about a component axis of rotation. A measurement of distance between the proximity sensor and the target surface as measured by the proximity sensor is indicative of an angular position of the rotatable component relative to the component axis of rotation.

Additionally or alternatively, in this or other embodiments the target surface is a curvilinear surface having a continuously variable or increasing radius.

Additionally or alternatively, in this or other embodiments the radius is centered on the component axis of rotation.

Additionally or alternatively, in this or other embodiments the one or more proximity sensors is at least two proximity sensors.

Additionally or alternatively, in this or other embodiments the two or more proximity sensors are offset in a direction along the component axis of rotation.

Additionally or alternatively, in this or other embodiments the two or more proximity sensors are offset circumferentially about the component axis of rotation.

Additionally or alternatively, in this or other embodiments the target surface is formed integral to the rotatable component.

In another embodiment, a variable pitch stator vane system of a gas turbine engine includes a plurality of stator vanes, each stator vane rotatable about a stator vane axis, a synchronization ring operably connected to each stator vane of the plurality of stator vanes such that movement of the synchronization ring urges rotation of each stator vane of the plurality of stator vanes about their respective stator vane axes, and a rotational position measurement system positioned at a stator vane of the plurality of stator vanes including one or more proximity sensors positioned at a fixed structure of the gas turbine engine, and one or more sensor targets positioned at the stator vane. Each sensor target of the one or more sensor targets includes a target surface having a variable distance between the target surface and the proximity sensor with rotation of the stator vane about the stator vane axis. A measurement of distance between the proximity sensor and the target surface as measured by the proximity sensor is indicative of an angular position of the stator vane relative to the stator vane axis.

Additionally or alternatively, in this or other embodiments the target surface is a curvilinear surface having a continuously variable or increasing radius.

Additionally or alternatively, in this or other embodiments the radius is centered on the stator vane axis.

Additionally or alternatively, in this or other embodiments the one or more proximity sensors is at least two proximity sensors.

Additionally or alternatively, in this or other embodiments the at least two proximity sensors are offset in a direction along the stator vane axis.

Additionally or alternatively, in this or other embodiments the at least two proximity sensors are offset circumferentially about the stator vane axis.

Additionally or alternatively, in this or other embodiments each stator vane is operably connected to the synchronization ring via a vane arm configured for rotation with the stator vane about the stator vane axis.

Additionally or alternatively, in this or other embodiments the target surface is formed integral to the vane arm.

In yet another embodiment, a gas turbine engine includes a turbine section, a combustor section configured to drive rotation of the turbine, and a compressor section including a variable pitch stator vane system, including a plurality of stator vanes, each stator vane rotatable about a stator vane axis, and a synchronization ring operably connected to each stator vane of the plurality of stator vanes such that movement of the synchronization ring urges rotation of each stator vane of the plurality of stator vanes about their respective stator vane axes. A rotational position measurement system is positioned at a stator vane of the plurality of stator vanes including one or more proximity sensors positioned at a fixed structure of the gas turbine engine, and one or more sensor targets positioned at the stator vane. Each sensor target of the one or more sensor targets included a target surface having a variable distance between the target surface and the proximity sensor with rotation of the stator vane about the stator vane axis. A measurement of distance between the proximity sensor and the target surface as measured by the proximity sensor is indicative of an angular position of the stator vane relative to the stator vane axis.

Additionally or alternatively, in this or other embodiments the target surface is a curvilinear surface having a continuously variable or increasing radius.

Additionally or alternatively, in this or other embodiments the radius is centered on the stator vane axis.

Additionally or alternatively, in this or other embodiments each stator vane is operably connected to the synchronization ring via a vane arm configured for rotation with the stator vane about the stator vane axis.

Additionally or alternatively, in this or other embodiments the target surface is formed integral to the vane arm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
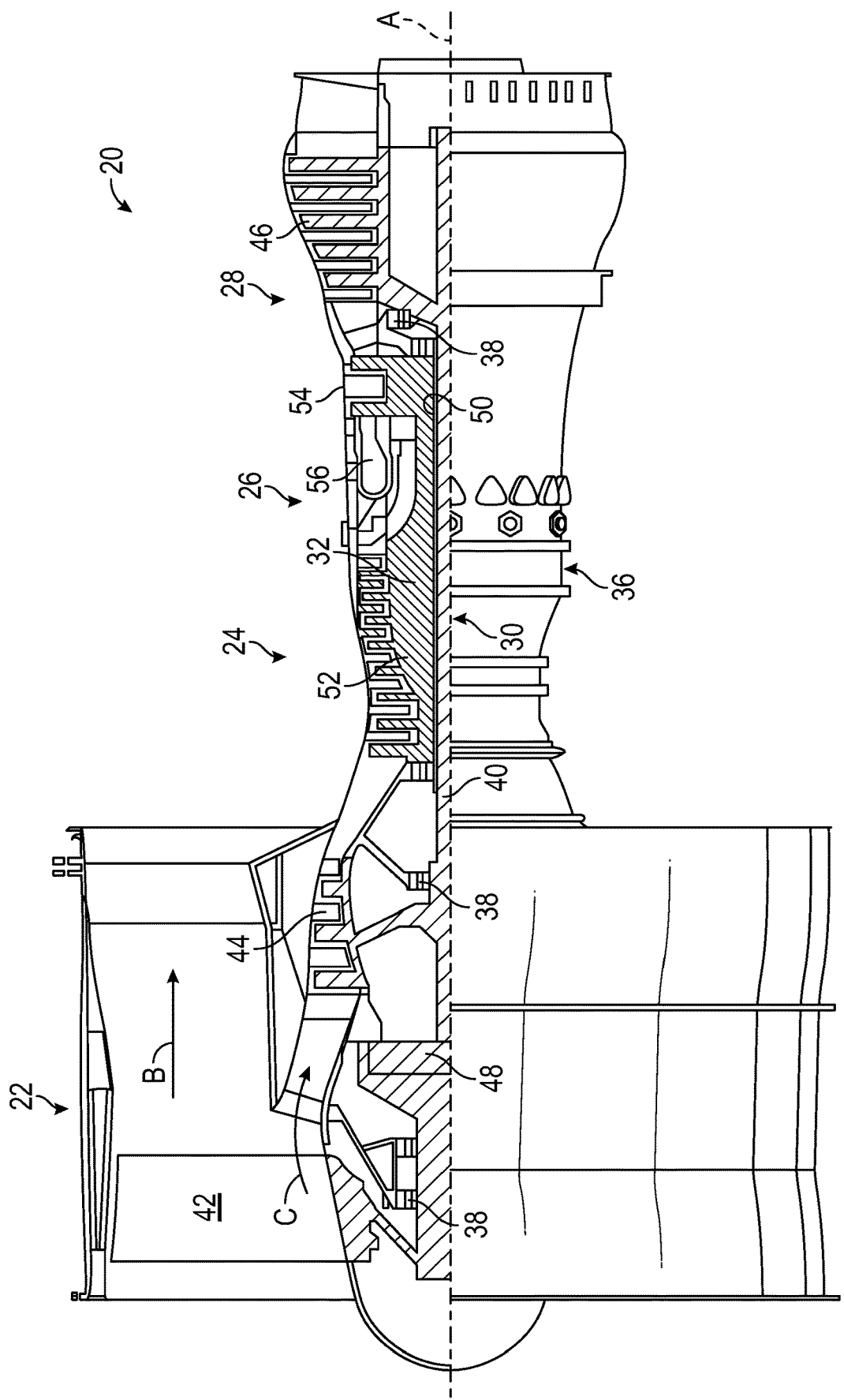
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis "A" relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

Figure 2:
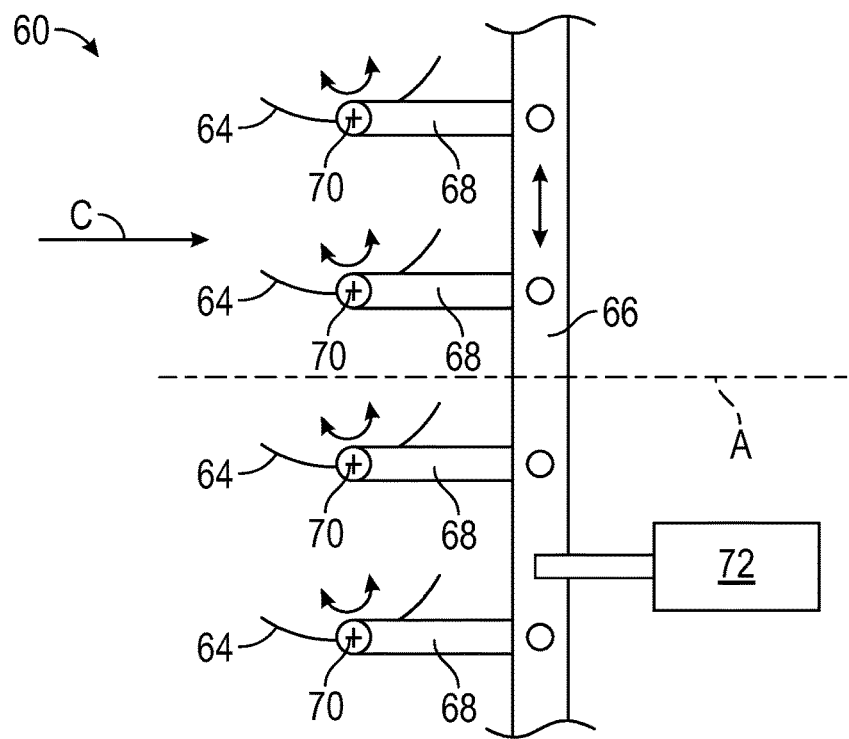
FIG. 2 is a schematic view of an embodiment of a variable pitch stator of a gas turbine engine.

FIG. 2 illustrates a low compressor stator row 60, having a variable pitch stator vane system with a plurality of stator vanes 64. Each of the stator vanes 64 is connected to a synchronization ring 66 via a vane arm 68. The assembly is configured such that when the synchronization ring 66 is rotated circumferentially about the engine central longitudinal axis A, each of the stator vanes 64 rotates about a vane axis 70 by, for example, an actuator 72 operably connected to the synchronization ring 66. Rotation of the stator vanes 64 about their respective vane axes 70 changes a leading edge incidence angle and a trailing edge discharge angle of the flow by varying a pitch of the vanes 64 relative to the core flow C. While described herein in the context of a low pressure compressor 44 of a gas turbine engine 20, one skilled in the art will readily appreciate that the present disclosure may be similarly applied to synchronization ring and vane arrangements in other sections of the gas turbine engine 20, for example, the fan section 42, the low pressure turbine 46, the high pressure compressor 52 or the high pressure turbine 54.

Figure 3:
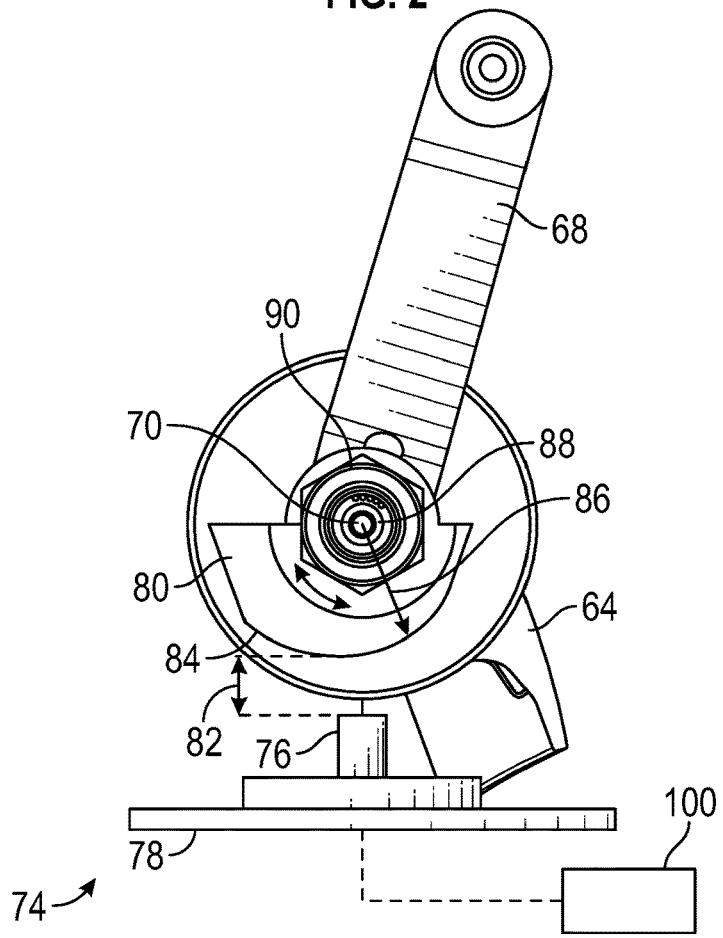
FIG. 3 is a schematic illustration of an embodiment of a vane rotational position measurement system.
Figure 4:
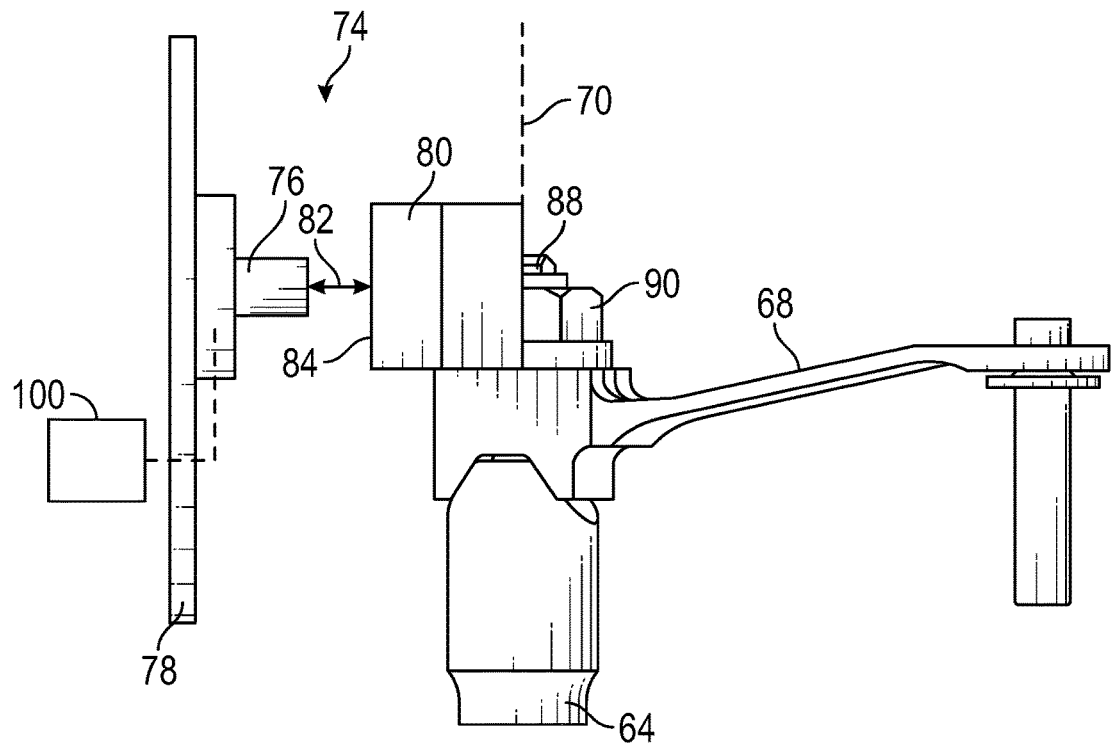
FIG. 4 is another schematic illustration of the embodiment of a vane rotational position measurement system of FIG. 3.

Referring to FIGS. 3 and 4, illustrated is an embodiment of a stator vane 64 and position measurement system 74 for detecting a rotational position of the stator vane 64. The position measurement system 74 includes a proximity sensor 76 mounted fixedly to a static or fixed structure of the gas turbine engine 20. In some embodiments, for example, the proximity sensor 76 is secured to a case flange 78, or alternatively to a case boss or a bracket secured to a case or case flange 76, or an adjacent stator vane stem of an adjacent stator vane, not stator vane 64 at which the position is measured. A sensor target 80 is located at the stator vane 64 and is secured and configured to rotate with the stator vane 64 about the vane axis 70. The proximity sensor 76 is oriented to detect the sensor target 80 and determine a target distance 82 between the proximity sensor 76 and the sensor target 80. More specifically, the sensor target 80 includes a target surface 84, which is detected by proximity sensor 76.

The target surface 84 is configured such that the target distance 82 changes with rotation of the stator vane 64 about the vane axis 70. Thus, the target distance 82 is indicative of a stator vane 64 angular position about the vane axis 70. Measurements of the target distance 82 is transmitted to an engine control system 100, a testing data acquisition system, or the like, which correlates the measured target distance 82 to a stator vane angle 102.

In some embodiments, such as illustrated in FIG. 3, the target surface 84 is a curvilinear surface having a continuously increasing radius 86 centered at the vane axis 70. In some embodiments, the target surface 84 has a circumferential span about the vane axis of about 100 degrees. While a target surface 84 having a continuously increasing radius 86 is illustrated in the embodiment of FIG. 3, in other embodiments the target surface 84 may have other configurations. As shown best in FIG. 4, the sensor target 80 is secured to a vane stem 88 of the stator vane 64, axially between the vane arm 68 and a vane arm retention nut 90.

Figure 5:
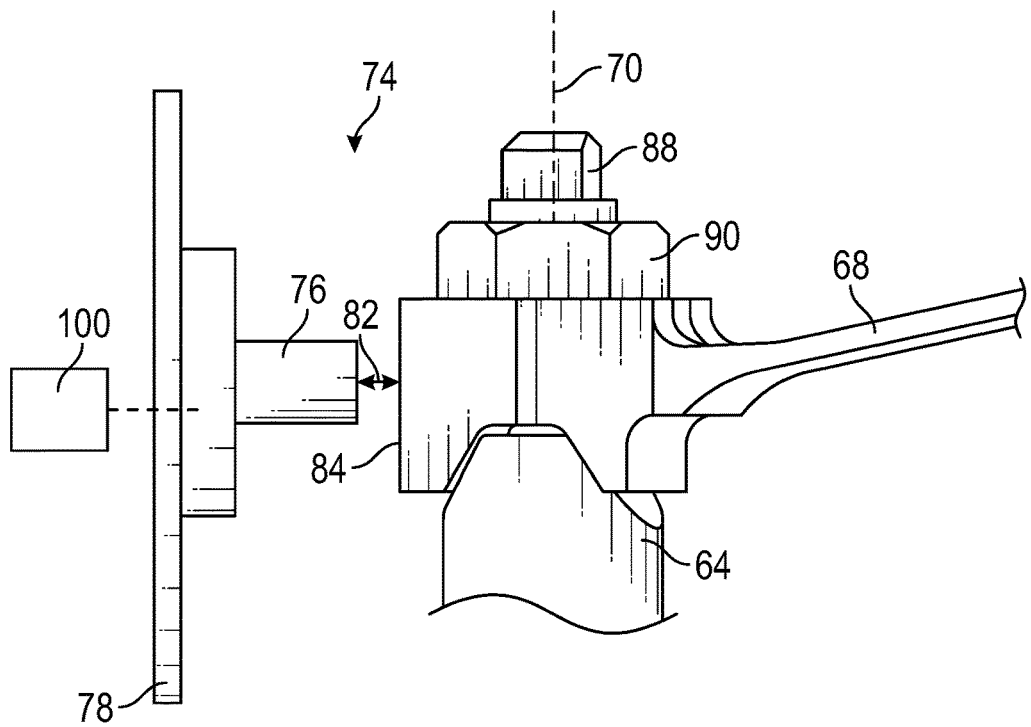
FIG. 5 is a schematic illustration of an embodiment of a vane rotational position measurement system.
Figure 6:
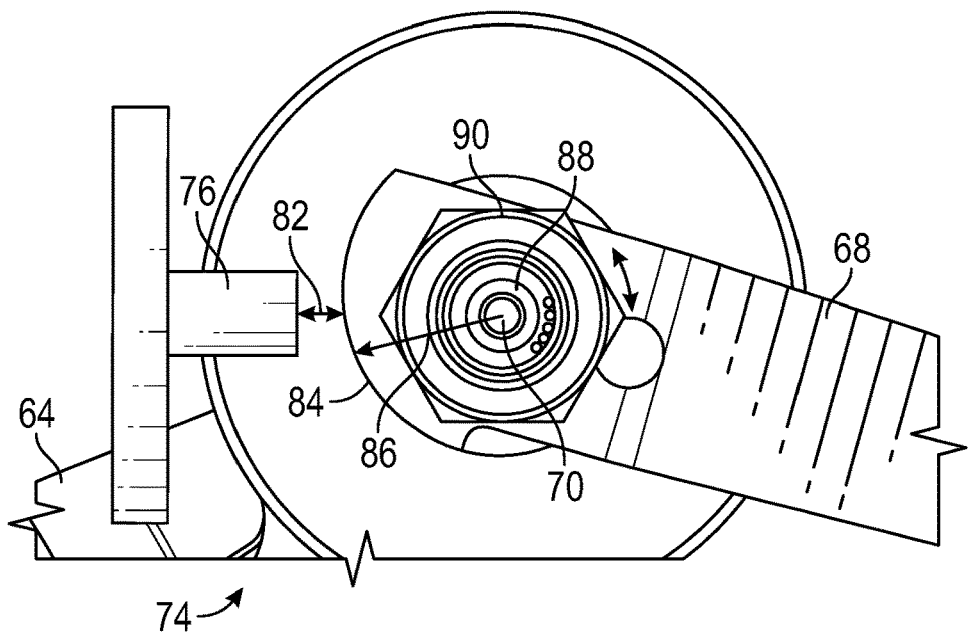
FIG. 6 is another schematic illustration of the embodiment of a vane rotational position measurement system of FIG. 5.

In another embodiment, as shown in FIGS. 5 and 6, a separate sensor target is not utilized, and the target surface 84 is formed as a portion of the vane arm 68. This configuration advantageously does not require the additional part to be added when it is desired to measure the stator vane 64 angle. This allows for checks during gas turbine engine 20 assembly, and real-time monitoring during operation of the gas turbine engine 20.

Figure 7:
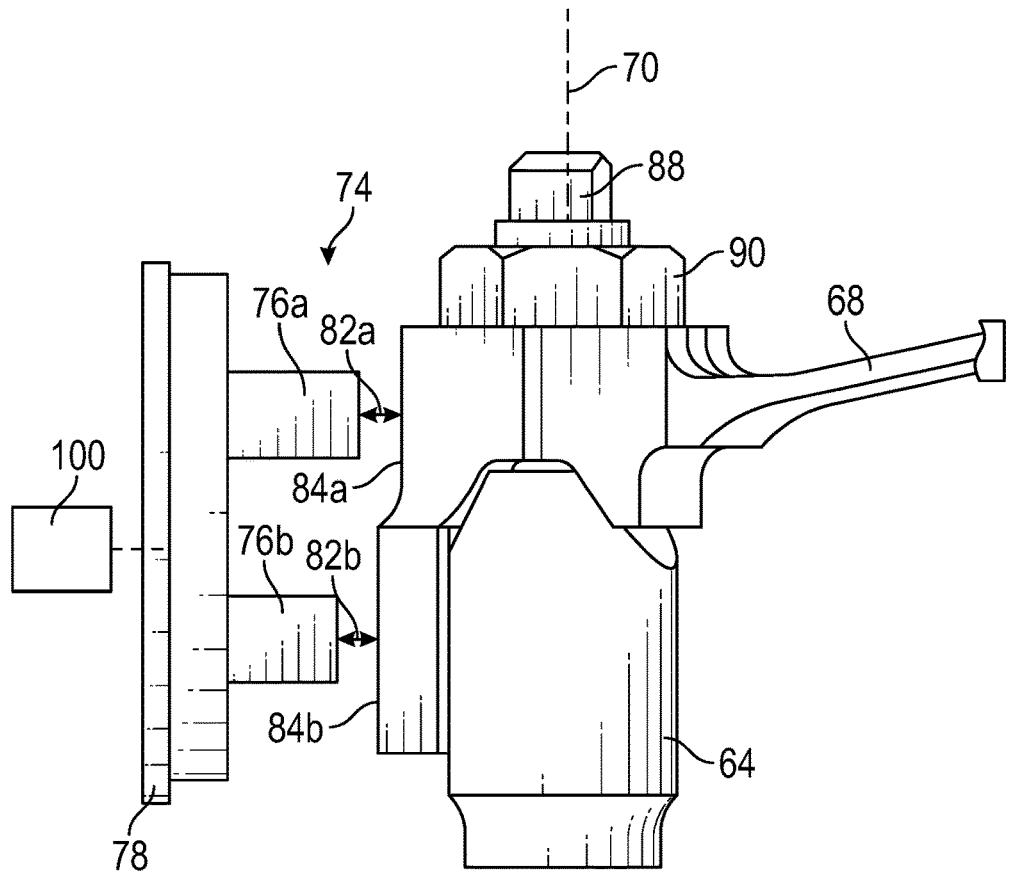
FIG. 7 is yet another schematic illustration of an embodiment of a vane rotational position measurement system.

Other embodiments, such as shown in FIG. 7 include multiple proximity sensors 76 and multiple sensor targets 82 and target surfaces 84. In this embodiment, A first proximity sensor 76a and a first target surface 84a are located outboard of a second proximity sensor 76b and a second target surface 84b, along the vane axis 70 direction. When both proximity sensors 76 are utilized, gap 82b is a measurement of positional shift of target surface 84b relative to sensor face 76b. Further, such an arrangement may be utilized for monitoring of vibration of the stator vanes 64. While two proximity sensors 76 and two sensor targets 82 are described herein, one skilled in the art will readily appreciate that in some embodiments three, four or more proximity sensors 76 and sensor targets 82 may be utilized.

Figure 8:
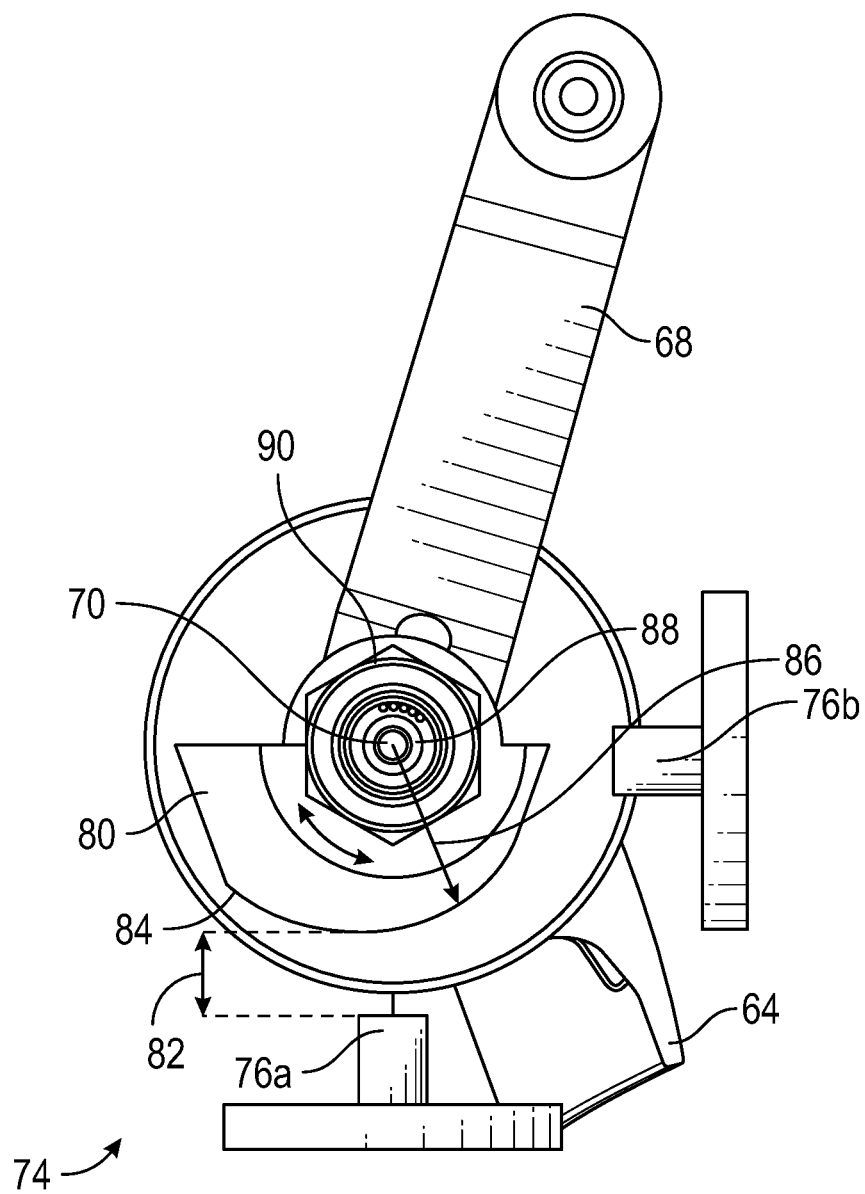
FIG. 8 is a schematic illustration of still another embodiment of a vane rotational position measurement system.

In another embodiment, as illustrated in FIG. 8, a first proximity sensor 76a is circumferentially offset about the vane axis 70 from a second proximity sensor 76b. In some embodiments, the circumferential offset is about 90 degrees. Such a configuration allows for assessment of positional and circumferential shift of the target surfaces 84 relative to the proximity sensors 76 and also provides redundancy in measurement of the stator vane 64 angle.

While the proximity sensor 76 and target surface 84 described herein are utilized for measuring position of the stator vanes 64, one skilled in the art will readily appreciate that such an arrangement may be utilized for positional detection of other rotatable components, such as a compressor bleed valve, a variable nozzle position, or a synchronization ring linkage position, or any other components where it is desired to obtain one or more of angle of rotation, translation in axis or rotation, or axial shift of rotation.

The configurations disclosed herein are more highly temperature tolerant relative to a typical RVDT arrangement, thus reducing cooling needs for measurement. Further, the measurement is non-contact, and has fewer moving parts to improve measurement accuracy and reliability. Further, the configurations have greater angle resolution per degree meaning higher angle accuracy and repeatability.

The term "about" is intended to include the degree of error associated with measurement of the particular quantity based upon the equipment available at the time of filing the application. For example, "about" can include a range of ±8% or 5%, or 2% or less of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A measurement system for determining an angular position of a component of a gas turbine engine, comprising:
    one or more proximity sensors disposed at a fixed structure of the gas turbine engine; and
    one or more sensor targets disposed at a rotatable component of the gas turbine engine, each sensor target of the one or more sensor targets including a target surface having a variable distance between the target surface and the proximity sensor with rotation of the rotatable component about a component axis of rotation;
    wherein a measurement of distance between the proximity sensor and the target surface as measured by the proximity sensor is indicative of an angular position of the rotatable component relative to the component axis of rotation;
    wherein the target surface is a curvilinear surface having one of a continuously variable or continuously increasing radial distance from the component axis of rotation.

2. The measurement system of claim 1, wherein the radius is centered on the component axis of rotation.

3. The measurement system of claim 1, wherein the one or more proximity sensors is at least two proximity sensors.

4. The measurement system of claim 3, wherein the two or more proximity sensors are offset in a direction along the component axis of rotation.

5. The measurement system of claim 3, wherein the two or more proximity sensors are offset circumferentially about the component axis of rotation.

6. The measurement system of claim 1, wherein the target surface is formed integral to the rotatable component.

7. A variable pitch stator vane system of a gas turbine engine, comprising:
    a plurality of stator vanes, each stator vane rotatable about a stator vane axis;
    a synchronization ring operably connected to each stator vane of the plurality of stator vanes such that movement of the synchronization ring urges rotation of each stator vane of the plurality of stator vanes about their respective stator vane axes; and
    a rotational position measurement system disposed at a stator vane of the plurality of stator vanes including:
        one or more proximity sensors disposed at a fixed structure of the gas turbine engine; and
        one or more sensor targets disposed at the stator vane, each sensor target of the one or more sensor targets including a target surface having a variable distance between the target surface and the proximity sensor with rotation of the stator vane about the stator vane axis;
        wherein a measurement of distance between the proximity sensor and the target surface as measured by the proximity sensor is indicative of an angular position of the stator vane relative to the stator vane axis;
        wherein the target surface is a curvilinear surface having one of a continuously variable or continuously increasing radial distance from the stator vane axis.

8. The variable pitch stator vane system of claim 7, wherein the radius is centered on the stator vane axis.

9. The variable pitch stator vane system of claim 7, wherein the one or more proximity sensors is at least two proximity sensors.

10. The variable pitch stator vane system of claim 9, wherein the at least two proximity sensors are offset in a direction along the stator vane axis.

11. The variable pitch stator vane system of claim 9, wherein the at least two proximity sensors are offset circumferentially about the stator vane axis.

12. The variable pitch stator vane system of claim 7, wherein each stator vane is operably connected to the synchronization ring via a vane arm configured for rotation with the stator vane about the stator vane axis.

13. The variable pitch stator vane system of claim 12, wherein the target surface is formed integral to the vane arm.

14. A gas turbine engine, comprising:
    a turbine section;
    a combustor section configured to drive rotation of the turbine; and
    a compressor section, including:
        a variable pitch stator vane system, including:
            a plurality of stator vanes, each stator vane rotatable about a stator vane axis;
            a synchronization ring operably connected to each stator vane of the plurality of stator vanes such that movement of the synchronization ring urges rotation of each stator vane of the plurality of stator vanes about their respective stator vane axes; and
            a rotational position measurement system disposed at a stator vane of the plurality of stator vanes including:
                one or more proximity sensors disposed at a fixed structure of the gas turbine engine; and
                one or more sensor targets disposed at the stator vane, each sensor target of the one or more sensor targets including a target surface having a variable distance between the target surface and the proximity sensor with rotation of the stator vane about the stator vane axis;
                wherein a measurement of distance between the proximity sensor and the target surface as measured by the proximity sensor is indicative of an angular position of the stator vane relative to the stator vane axis;
                wherein the target surface is a curvilinear surface having one of a continuously variable or continuously increasing radial distance from the stator vane axis.

15. The gas turbine engine of claim 14, wherein the radius is centered on the stator vane axis.

16. The gas turbine engine of claim 14, wherein each stator vane is operably connected to the synchronization ring via a vane arm configured for rotation with the stator vane about the stator vane axis.

17. The gas turbine engine of claim 16, wherein the target surface is formed integral to the vane arm.

* * * * *